US006478105B2

(12) United States Patent
Okuma

(10) Patent No.: US 6,478,105 B2
(45) Date of Patent: Nov. 12, 2002

(54) AIR CLEANER FITTING STRUCTURE FOR MOTORCYCLE

(75) Inventor: Takanori Okuma, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,926

(22) Filed: Mar. 30, 2001

(65) Prior Publication Data

US 2001/0030071 A1 Oct. 18, 2001

(30) Foreign Application Priority Data

Mar. 31, 2000 (JP) ....................................... 2000-099521

(51) Int. Cl.[7] ............................................... B60K 13/02
(52) U.S. Cl. ...................... 180/219; 55/385.3; 180/68.3
(58) Field of Search ................................ 180/219, 227, 180/228, 68.3, 229; 55/385.3; 123/198 E

(56) References Cited

U.S. PATENT DOCUMENTS 4,224,919 A * 9/1980 Appelbaum ................. 180/219
4,402,379 A * 9/1983 Hoshi ......................... 180/225
4,440,555 A * 4/1984 Chichester ................. 55/385.3
4,445,585 A * 5/1984 Imani ........................ 180/68.5
4,515,236 A * 5/1985 Kanamori ................... 180/227
4,597,466 A * 7/1986 Yamada ...................... 180/215
4,756,380 A * 7/1988 Uehara ....................... 180/227
4,778,029 A * 10/1988 Thornburgh ............... 180/68.3
4,781,264 A * 11/1988 Matsuzaki et al. .......... 180/219
6,287,354 B1 * 9/2001 Nozaki ...................... 55/385.3
6,299,661 B1 * 10/2001 Bloomer .................... 55/385.3
6,325,169 B1 * 12/2001 Tateshima et al. .......... 180/219

FOREIGN PATENT DOCUMENTS

JP 2639608 9/1993

* cited by examiner

*Primary Examiner*—Anne Marie Boehler
(74) *Attorney, Agent, or Firm*—Birch, Stewart, Kolasch & Birch, LLP

(57) ABSTRACT

To provide an air cleaner fitting structure for a motorcycle that can form an ideal frame line without being limited by the position of the internal combustion engine and the fuel supply system, which can bring about favorable maintenance conditions. In an air cleaner fitting structure for a motorcycle having a vehicle frame in which a pair of right and left center frames extending downward, connected to a mainframe extending rearwards from a head pipe, and having an internal combustion engine arranged in front of the center frame below the main frame, a connecting tube for connecting an air cleaner arranged further rearward from the center frame and a fuel supply system at a front thereof is divided into front and rear halves. Furthermore, a division line between the front and rear halves of the connecting tube is located rearward from the center frame of the vehicle frame.

21 Claims, 8 Drawing Sheets

AIR CLEANER FITTING STRUCTURE FOR MOTORCYCLE

BACKGROUND OF THE INVENTION

1. Field of the Invention

The present invention relates to an air cleaner fitting structure for a motorcycle. In particular, the present invention relates to a fitting structure for a connecting tube which connects the air cleaner and a fuel supply system.

2. Description of Background Art

Referring to FIG. 8, for example, as described in Patent Publication No. 2639608, a motorcycle in which a 4-cycle internal combustion engine 04 is suspended from a vehicle frame having a construction such that one mainframe 01 (or a pair of right and left mainframes) extending rearwards from a head pipe is connected to right and left center frames 02. In addition, a carburetor 05 arranged at the rear of the cylinder of the internal combustion engine 04 and an air cleaner 06 arranged at the rear of the center frames 02 are connected by a connecting tube 07.

The air cleaner 06 has a case generally made of resin, which is arranged on the vehicle frame with a rear end of the connecting tube 07 generally made of rubber being fitted thereto in advance. Furthermore, the front end of the connecting tube 07 extending further forward than the air cleaner 06 is fitted by insertion in the mouth of the upstream port of the carburetor 05 already arranged, and fastened by a band, so as to connect the carburetor 05 and the air cleaner 06.

As shown in FIG. 8, since the carburetor 05 at the rear of the cylinder of the internal combustion engine 04 is located slightly ahead of the center frames 02, the band-fastened portion 08 of the front end of the connecting tube 07 and the mouth of the carburetor 05 is located roughly between the center frames 02.

The band-fastened portion is a cross member for supporting the upper end of the rear cushion above the band-fastened portion or for reinforcement, and is located between the center frames 02 at the right and left sides thereof, with little room therebetween.

However, a space for inserting a tool for band-fastening the carburetor 05 and the connecting tube 07 should be ensured for maintenance or the like. As a result, the arrangement and size or shape of the center frames 02 are limited, leaving a limited degree of freedom in securing the rigidity and strength of the frame.

Therefore, a frame line constituted by the mainframe 01 that connects the head pipe and a pivot supporting the rear wheel for swinging movement and the center frame 02 may have a shape making a detour in order to avoid the band-fastening portion. As a result, the weight increases and the center of gravity may move upward.

SUMMARY OF THE INVENTION

In view of the above situation, it is an object of the present invention to provide an air cleaner fitting structure for a motorcycle that can form an ideal frame line without being limited in position by the internal combustion engine and the fuel supply system, and can ensure ease of maintenance.

In order to achieve the above object, according to a first aspect of the present invention, an air cleaner fitting structure for a motorcycle having a vehicle frame in which a pair of right and left center frames extend downward, are connected to a mainframe extending rearwards from a head pipe, and have an internal combustion engine arranged in front of the center frame below the main frame is provided. The air cleaner fitting structure includes a connecting tube for connecting an air cleaner arranged further rearwards than the center frame and a fuel supply system at the front thereof is divided into front and rear halves. Furthermore, the division line thereof is at a position further rearwards than the center frame of the vehicle frame.

Since the connecting tube is divided into front and rear halves, even if the arrangement of the internal combustion engine and the fuel supply system such as the carburetor is slightly changed, the division line of the connecting tube can be located at the rear of the center frame. As a result, an operation for connecting or disconnecting the divided front and rear halves of the connecting tube with a band or the like can be easily performed without being hindered by the center frame or the like, thereby improving ease of maintenance.

Specifically, an ideal frame line can be formed without being limited by the position of the internal combustion engine and the fuel supply system such as carburetor or the like, sufficient vehicle frame strength can be ensured, increase in weight and the center of gravity can be avoided, and ease of maintenance can be ensured.

According to a second aspect of the present invention, an air cleaner fitting structure for a motorcycle according to the first aspect is provided, wherein the front half of the divided connecting tube is constructed by a flexible member, and the rear half thereof is constructed by a member having higher rigidity than the front half.

By dividing the connecting tube in two, the front half of the connecting tube is constructed of a flexible member, and the rear half thereof is constructed freely in combination with a member having a higher rigidity than the front half and a member having a low center of gravity. As a result, the connecting tube can be made light, while adequate rigidity is ensured for the connecting tube.

According to a third aspect of the present invention, an air cleaner fitting structure for a motorcycle according to the second aspect is provided, wherein the front half of the connecting tube is made of rubber, and the rear half of the connecting tube is made of resin.

Since the front half of the connecting tube is made of rubber, and the rear half of the connecting tube is made of resin, the connecting tube can be made light, while adequate rigidity for the connecting tube is ensured.

According to a fourth aspect of the present invention, an air cleaner fitting structure for a motorcycle according to the first aspect is provided, wherein a rear cushion is arranged, oriented substantially in the vertical direction, between the air cleaner and the fuel supply system, and the connecting tube is arranged in a prescribed location, avoiding the rear cushion.

Even if the rear cushion is between the air cleaner and the fuel supply system, the division line of the connecting tube is located at the rear of the center frame, so that the front and the rear halves thereof can be connected without being hindered by the rear cushion.

According to a fifth aspect of the present invention, an air cleaner fitting structure for a motorcycle according to the first aspect is provided, wherein the mainframe is a pair of right and left frames having an oblong cylindrical shape in section, and the center frame respectively connected to each mainframe is broad towards the front and rear.

A frame line connecting the head pipe and a pivot supporting the rear wheel for swinging movement is constituted by the mainframe and the center frame, and the frame line constituted by the mainframe and the center frame can be made in an ideal shape without being limited by the position of the internal combustion engine and the fuel supply system, to thereby obtain a strong structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
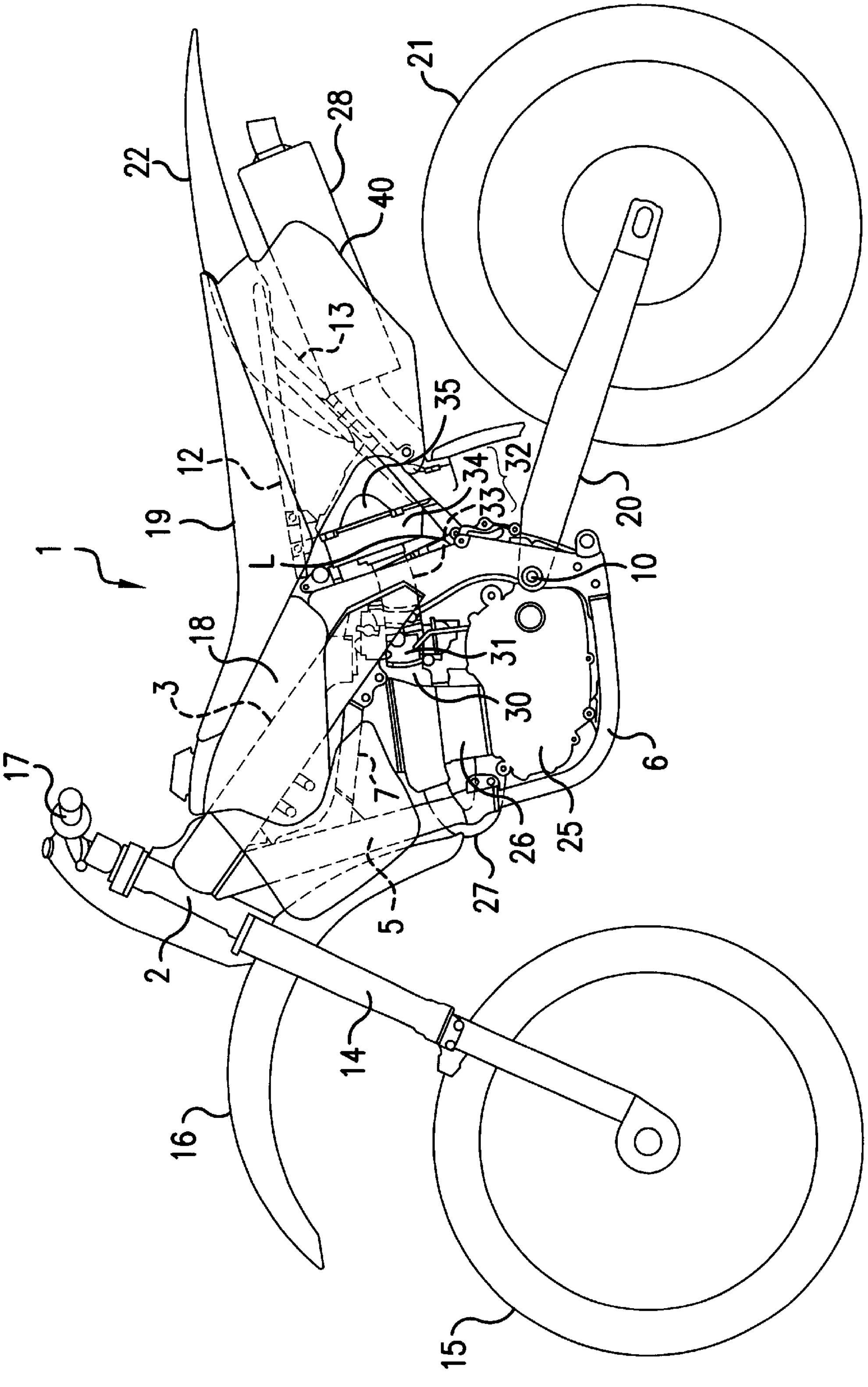
FIG. 1 is an overall side view of a motorcycle according to one embodiment of the present invention.
Figure 2:
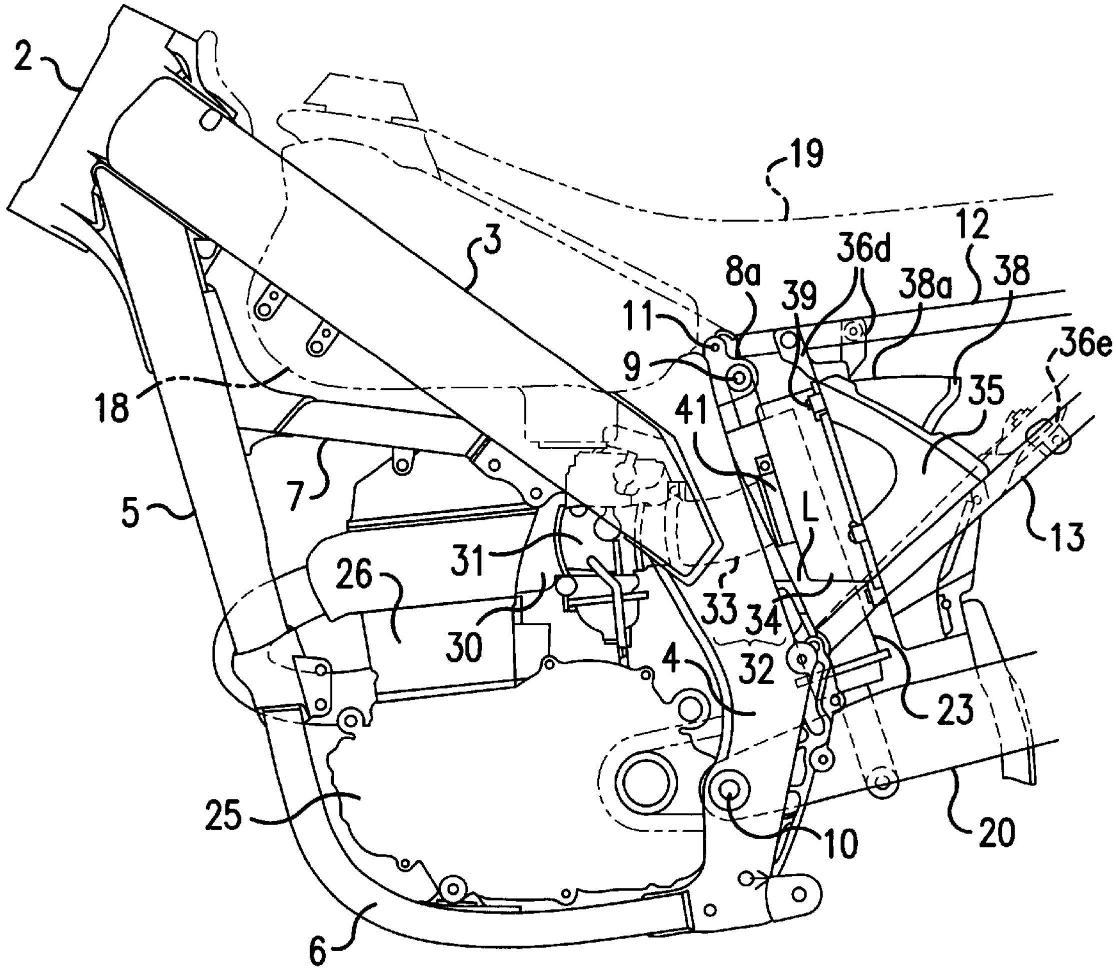
FIG. 2 is an enlarged diagram of a main part of the motorcycle of FIG. 1.
Figure 3:
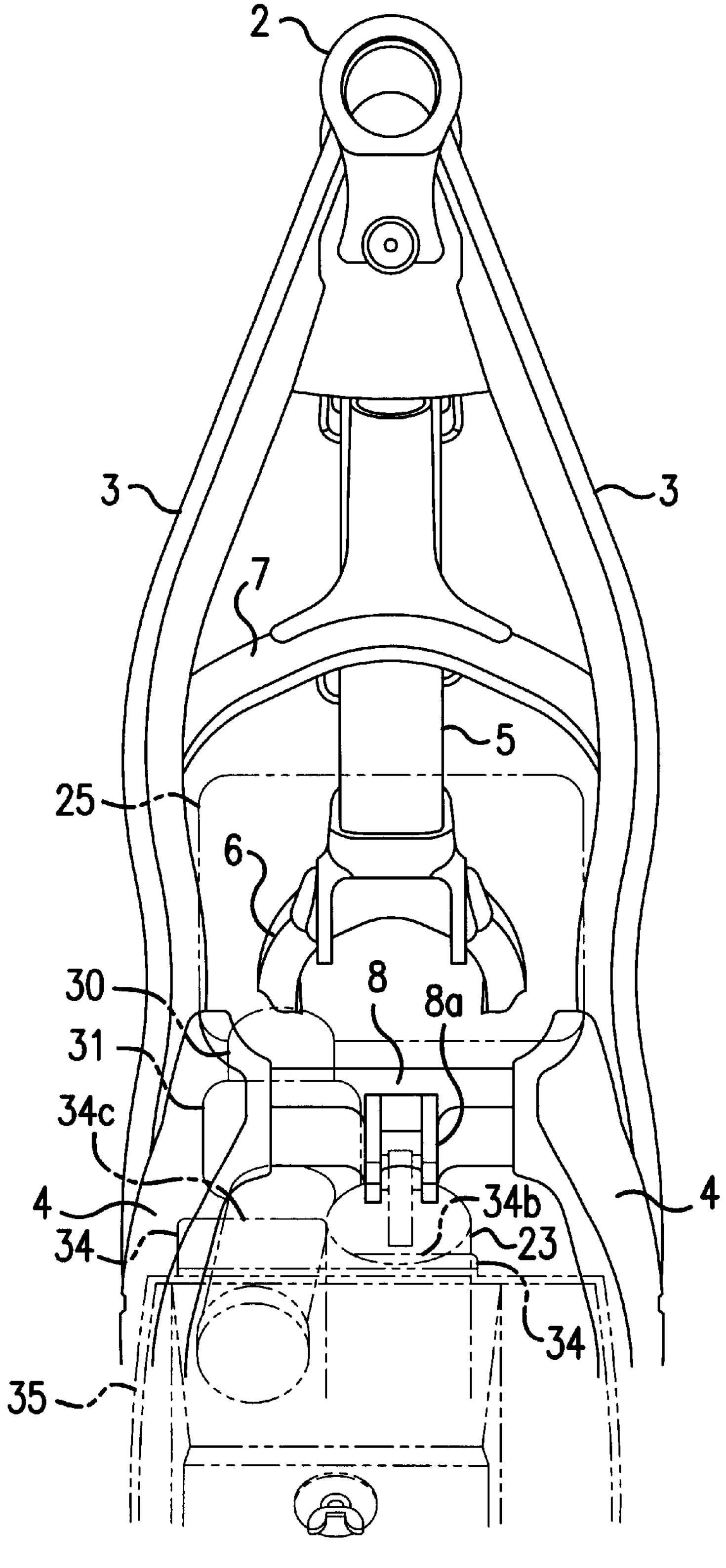
FIG. 3 is a top view of the vehicle frame of FIG. 2.

One embodiment of the present invention will now be described with reference to FIGS. 1 to 7. FIG. 1 is an overall side view of a motorcycle 1 according to this embodiment, FIG. 2 is an enlarged diagram of a main part of the motorcycle of FIG. 1, and FIG. 3 is a partial top view of the vehicle frame of FIG. 2.

The vehicle frame of the motorcycle 1 is constructed such that a pair of right and left main frames 3 extend downward to the rear from a head pipe 2. A pair of right and left center frames 4, respectively connected to the rear ends of the pair of right and left main frames 3, extend downward therefrom.

In addition, one down frame 5 extends downward from the head pipe 2, and lower frames 6 are divided into right and left sides from the lower end of the down frame 5 so as to extend further downward and bend rearward. The lower frames 6 then extend horizontally and connect to the lower ends of the center frames 4, respectively.

A reinforcing pipe 7 is provided so as to hang across between the down frame 5 and the pair of right and left main frames 3. The main frame 3 and the down frame 5 are in a square pipe form, having high strength.

A cross member 8 is provided so as to hang across between the upper ends of the pair of right and left center frames 4, with a bracket **8*a* protruding upwards to the rear at the center of the cross member 8. The upper end of a rear cushion 23 is supported on a spindle 9 of the bracket 8*a***.

A pivot 10 is provided for pivotally supporting a rear fork 20 towards the lower center of the center frames 4.

In the above-described vehicle frame, the front end of a seat rail 12 is supported on a spindle 11 provided in the bracket **8*a*, and the rear part of the seat rail 12 and the central portion of the center frame 4 are connected by a back stay 13 to thereby support the seat rail 12**.

A front fork 14 is supported on the head pipe 2 for swinging movement, making use of a protrusion and a depression, with the lower end of the front fork 14 pivotally supporting the front wheel 15. A front fender 16 is provided above the front wheel 15, and a handlebar 17 is provided above the head pipe 2, so as to extend in the right and left directions.

A fuel tank 18 is mounted on the mainframes 3, spanning from above, and a seat 19 is supported by the seat rail 12 and provided at the rear of the fuel tank 18.

The rear fork 20 extends rearwards, with the front end being supported by the pivot 10 of the center frames 4 for swinging movement, making use of a protrusion and a depression, and with the rear end pivotally supporting the rear wheel 21. Furthermore, a rear fender 22 is provided above the rear wheel 21, supported by the seat rail and the back stay 13.

A rear cushion 23 is installed between the spindle 9 of the bracket **8*a* and the rear fork 20, and the rear cushion 23 is arranged rearward of the center frames 4**, when viewed from the side.

The internal combustion engine 25 mounted on the vehicle frame is a 4-cycle internal combustion engine. The engine 25 is mounted between the down frame 5 and the center frames 4, with a cylinder 26 arranged substantially perpendicularly.

An exhaust pipe 27 extending from the front exhaust port of the cylinder 26 arranged in a standing condition is curved on the right side of the vehicle frame towards the rear so as to be connected to a muffler 28.

A rear inlet port of the cylinder 26 and a carburetor 31 arranged at a rear adjacent position of the cylinder 26 are connected by an inlet pipe 30. The inlet pipe 30 is connected to the air cleaner 35, supported by the seat rail 12 and the backstay 13 at the rear, by a connecting tube 32. The upper part and the right and left sides of the air cleaner 35 are covered with a rear cover 40, extending rearward.

The connecting tube 32 is divided into front and rear halves, i.e., into a front half connecting tube 33 and a rear half connecting tube 34. The front half connecting tube 33 is connected to the carburetor 31 and is in a cylindrical shape, made of rubber and having flexibility. The rear half connecting tube 34 is connected to the air cleaner 35 and is in a box shape, made of resin.

The division line L of the connecting tube 32, where the front half connecting tube 33 and the rear half connecting tube 34 are connected, is at a position further rearward than the center frame 4, as shown in FIG. 1.

Figure 4:
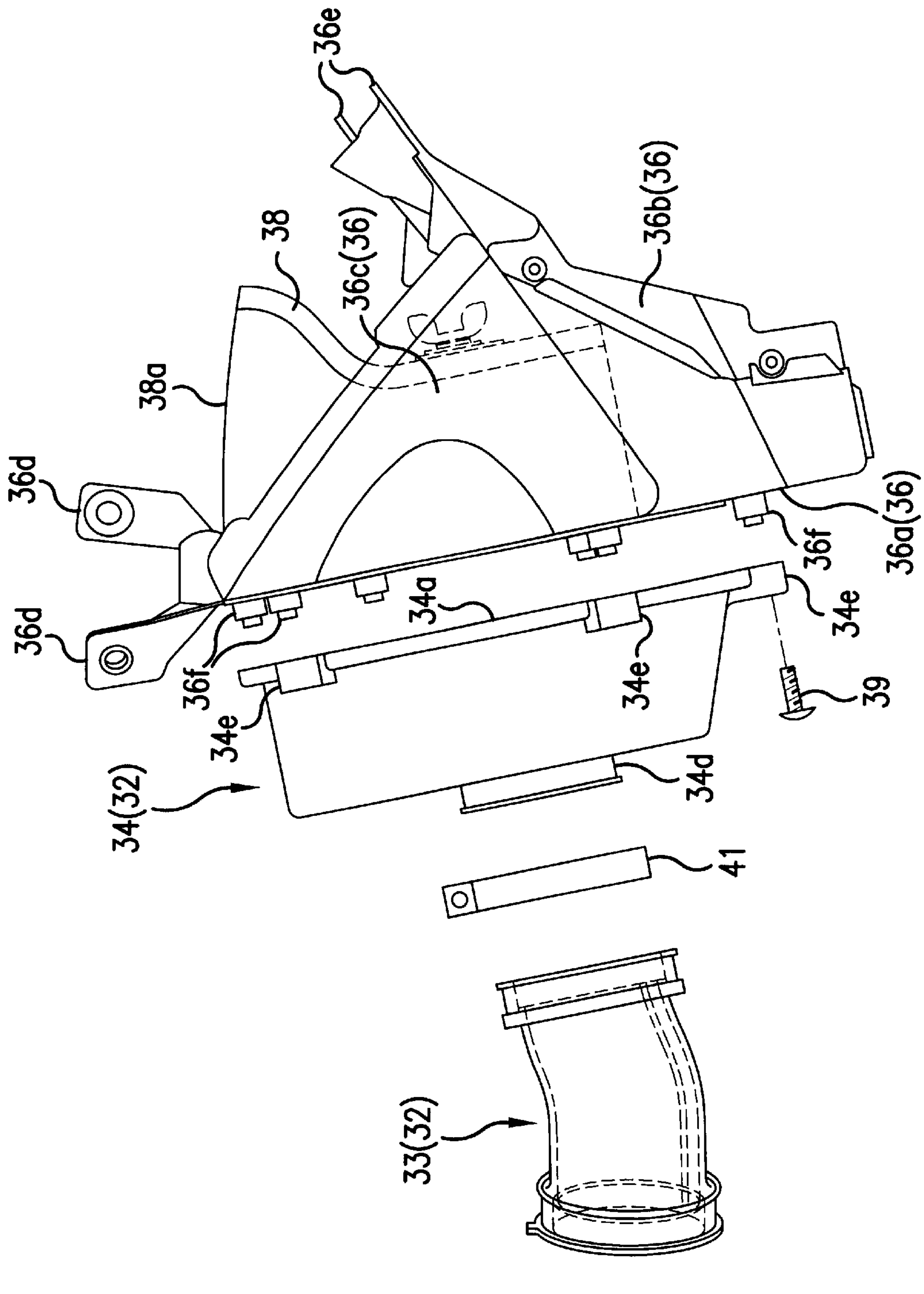
FIG. 4 is an exploded side view of an air cleaner and a connecting tube of the present invention.
Figure 5:
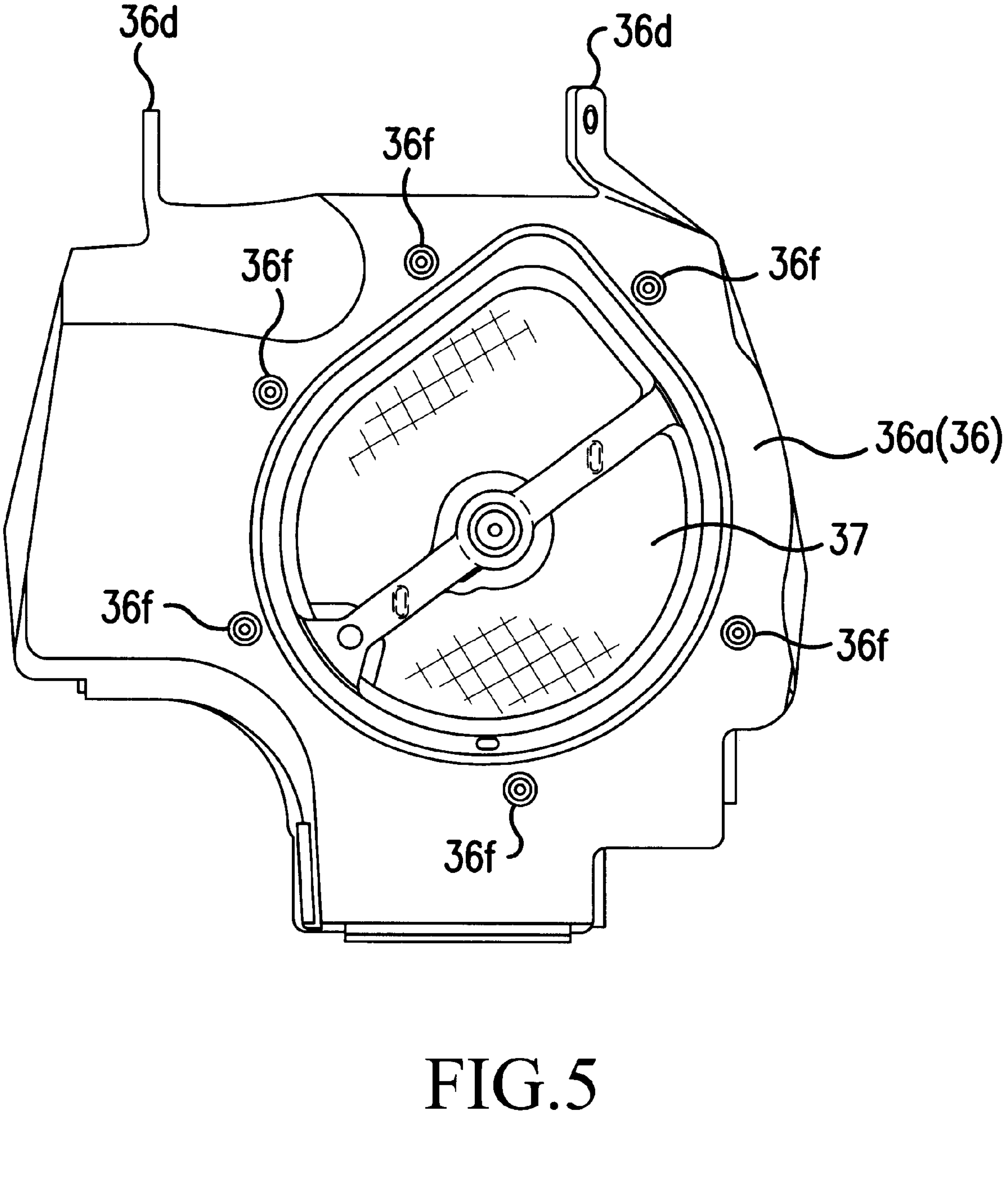
FIG. 5 is a front view of the air cleaner.

The construction of the air cleaner 35 is such that an air cleaner case 36 is formed of a front wall **36*a* and a bottom wall 36*b* forming an acute angle therebetween, as shown in FIG. 4 and FIG. 5, and the right and left sides thereof are enclosed by triangular side walls 36*c*. The front wall 36*a* has an opening lined with mesh 37, and a cylindrical case 38*a* is fitted inside the opening, with a cleaner element 38 disposed on the bottom wall of the cylindrical case 38*a***.

Fitting brackets **36*d* are provided, protruding upward, on the right and left sides of a rear end rim of the front wall 36*a* of the air cleaner case 36. Furthermore, fitting brackets 36*e* are provided, protruding upward, on the right and left sides of a rear end rim of the bottom wall 36***b*, the respective brackets 36*d* being fastened with a bolt to the right and left seat rails 12, and the respective brackets 36*e* being fastened with a bolt to the right and left back stays 13, so that the air cleaner 35 is fitted to the seat rail 12 and the back stay 13.

The air cleaner 35 is fitted such that it is located further rearwards than the center frame 4, with the front wall 36*a* being slightly inclined forward, and the bottom wall 36*b* being along the back stay 13. An upper part of the air cleaner case 36 is covered with the seat 19, and the sides thereof are covered with the rear cover 40.

Six fitting bosses 36*f* are formed around the opening on the front wall 36*a*, protruding on the front face, and the rear half connecting tube 34 is fitted on this front face, covering the opening.

Figure 6:
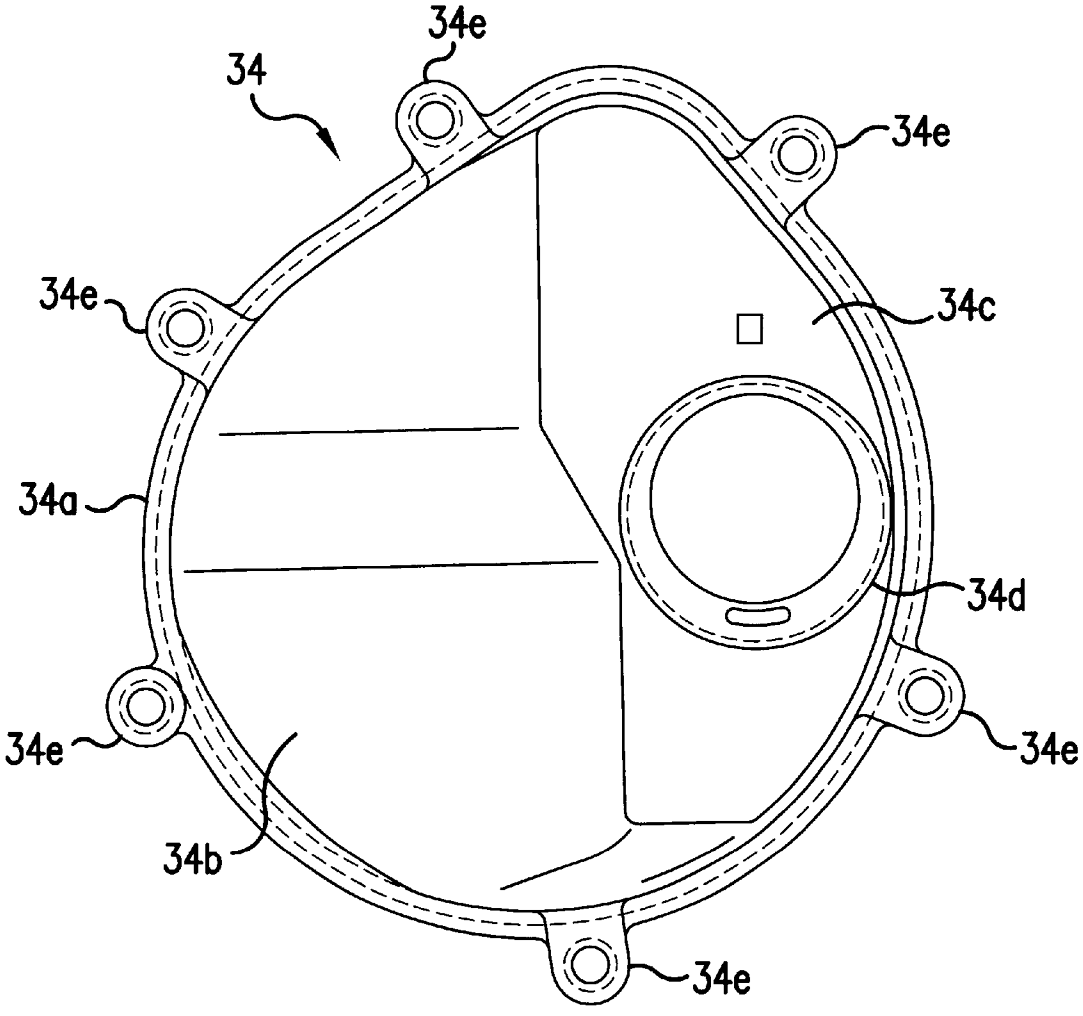
FIG. 6 is a front view of a rear half connecting tube.
Figure 7:
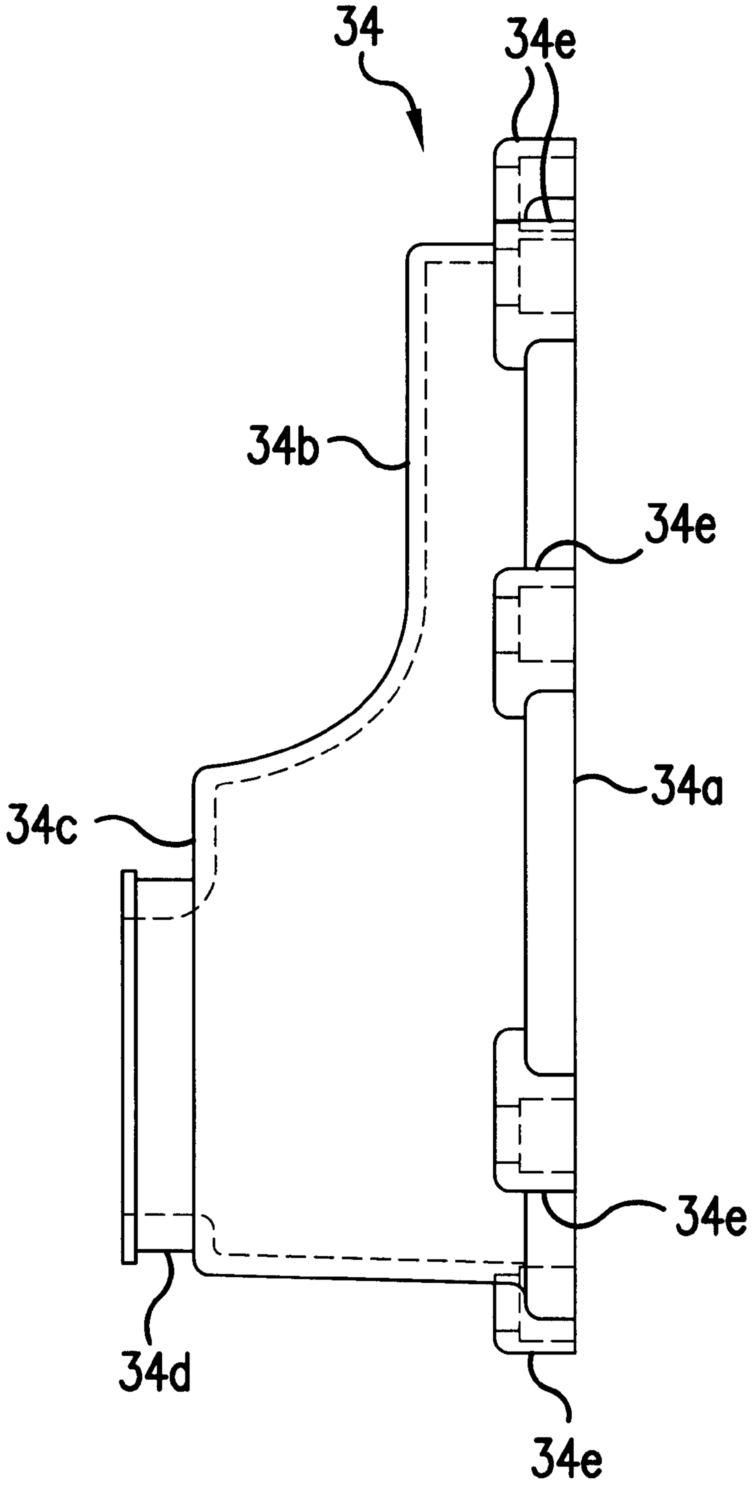
FIG. 7 is a top view of the rear half connecting tube.
Figure 8:
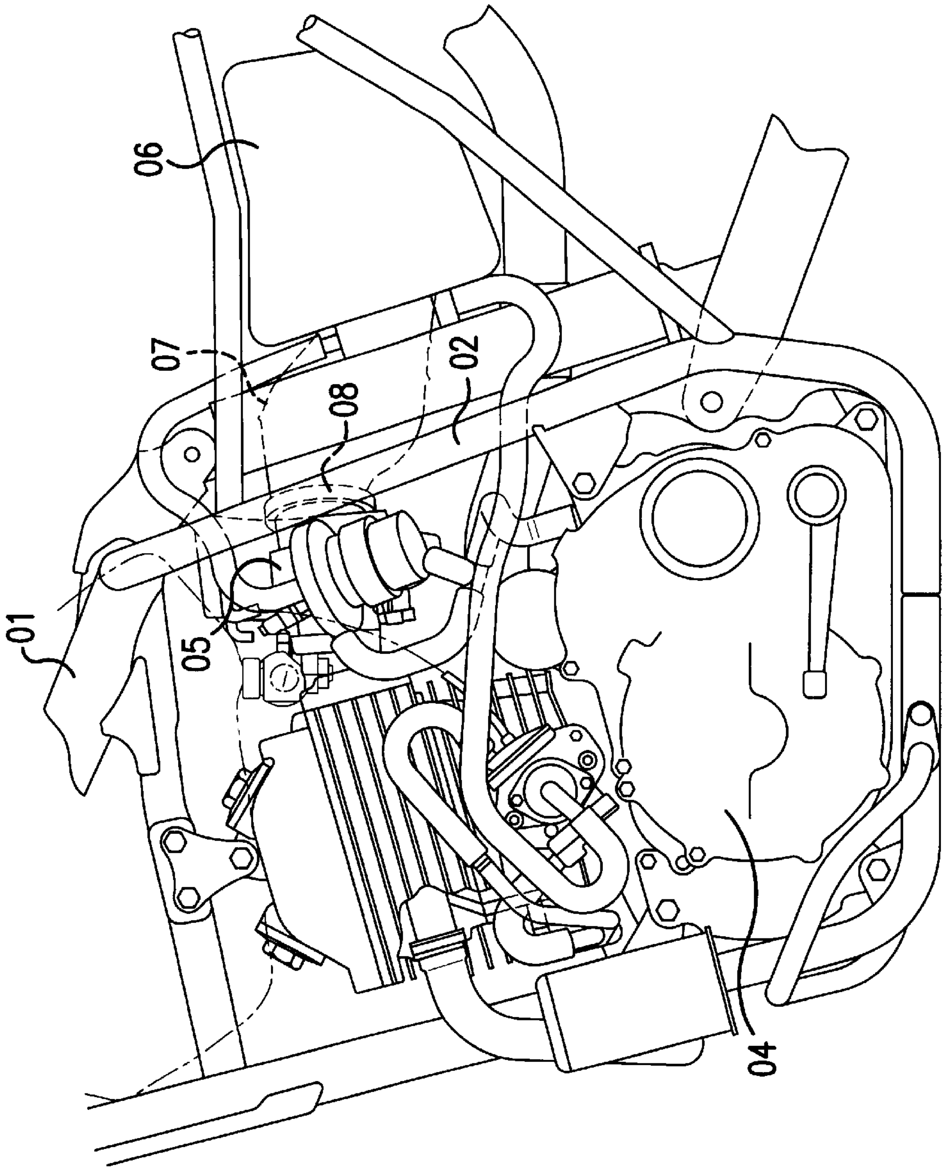
FIG.8 BACKGROUND ART
FIG. 8 is a side view of a main part of a motorcycle according to the background art.

The rear half connecting tube 34 is in a box shape, as shown in FIG. 4, FIG. 6 and FIG. 7, with the inside of an annular outer circumference 34*a* abutted against the front wall 36*a* of the air cleaner case 36 being expanded forward. The left expanded portion 34*c* (right side in the front view of FIG. 6) is expanded to a greater extent than the right expanded portion 34*b* (left side in FIG. 6), with the connecting tube 34*d* protruding on the front wall of the left expanded portion 34*c*.

Therefore, the rear half connecting tube 34 has such a shape that the right expanded portion 34*b* becomes dented forward more than the left expanded portion 34*c* having the connecting tube 34*d*.

Six fitting bosses 36*e* protrude on the annular outer circumference 34*a*, corresponding to the fitting bosses 36*f* on the air cleaner case. Accordingly, the rear half connecting tube 34 is allocated on the front face of the air cleaner case 36, with the fitting bosses 36*f* and 34*e* corresponding to each other, and the fitting bosses 36*f* and 34*e* are attached to each other by screws 39, to thereby mount the rear half connecting tube 34 on the front face of the air cleaner 35.

When the carburetor 31 is mounted with the front half connecting tube 33 and is connected to the inlet pipe 30 and arranged at the rear of the cylinder 26, and the air cleaner 35 is mounted with the rear half connecting tube 34 and is supported by the seat rail 12 and the back stay 13 in this manner, the rear cushion 23 is positioned in the dent on the right side of the rear half connecting tube 34 (see two-dot chain line in FIG. 3).

As shown in FIG. 3 by the two-dot chain line, the left expanded portion 34*c* is expanded forward on the left side of the rear cushion 23, and the connecting tube 34*d* is also protruding. Furthermore, the connecting tube 34*d* is at the position of the division line L (see FIG. 1 and FIG. 2), and is slightly rearward from the center frame 4.

Therefore, when connecting the rear end of the front half connecting tube 33 fitted to the carburetor 31 and extending rearward and the connecting tube 34*d* of the rear half connecting tube 34, the right and left sides of the division line L, being the connecting portion, are located at the rear of the center frames 4 and opened, thereby enabling easy operation using tools.

That is to say, the rear end of the front half connecting tube 33, being a rubber tube, is fitted by insertion to the connecting tube 34*d* of the rear half connecting tube 34, and a band 41 is fastened and coupled using tools. Accordingly, the assembly operation can be done easily.

Similarly, the band 41 can be loosened easily for disconnection, thereby providing ease of maintenance.

In this embodiment, since the rear cushion 23 is arranged on the right side of the connecting portion, the task of connecting from the right side of the vehicle frame is difficult, but the left side is completely opened, which makes the task of connecting straightforward.

As described above, even in a motorcycle having a structure in which the rear cushion 23 is arranged in the vicinity of the center frame 4, the fitting of the connecting tube 32 can be easily performed without being hindered by the rear cushion 23.

Since there is large degree of freedom in the position towards the front and back of the division line L, where the connecting tube 32 is divided into front and rear halves and the connection is performed, the frame line from the mainframe 3 to the center frame 4 connecting the head pipe 2 and the pivot 10 for supporting the rear fork 20 for swinging movement can be made in an ideal shape, without being limited in the arrangement of the internal combustion engine 25 and the carburetor 31. Specifically, a frame line shape having sufficient vehicle frame strength can be constructed, while enabling lightness in weight and a low center of gravity.

Since the front half connecting tube 33 of the connecting tube 32 is made of rubber, and the rear half connecting tube 34 is made of resin, the connecting tube 32 can have adequate rigidity, while still being light in weight.

Since the connecting tube is only divided into front and rear halves, fitting to a motorcycle having a conventional vehicle frame is also possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner fitting structure for a vehicle, the vehicle including an internal combustion engine arranged in front of the center frame below the main frame; said air cleaner fitting structure comprising:

- a vehicle frame having a pair of right and left center frames extending downward and connected to a mainframe extending rearwards from a head pipe;
- an air cleaner, said air cleaner being arranged rearward of the center frame of the vehicle frame and including:
  - a front wall and a bottom wall forming an acute angle therebetween, said front wall having an opening therein lined with a mesh material;
  - right and left sides enclosed by triangular side walls; and
  - a cylindrical case fitted inside said opening of said front wall, said cylindrical case for receiving a cleaner element on a bottom wall thereof;
- a connecting tube for connecting said air cleaner to a fuel supply system arranged forward of the center frame, said connecting tube being divided into a front half and a rear half; and
- a division line between said front half and said rear half of said connecting tube is located at a position rearward from the center frame of the vehicle.

2. The air cleaner fitting structure for a vehicle according to claim 1, wherein said front half of said connecting tube is constructed of a flexible member, and said rear half of said connecting tube is constructed of a member having higher rigidity than said front half.

3. The air cleaner fitting structure for a vehicle according to claim 2, wherein said front half of said connecting tube is made of rubber, and said rear half of said connecting tube is made of resin.

4. The air cleaner fitting structure for a vehicle according to claim 1, wherein a rear cushion of the vehicle is oriented substantially in a vertical direction, between the air cleaner and the fuel supply system, and said connecting tube is arranged in a prescribed location, avoiding the rear cushion.

5. The air cleaner fitting structure for a vehicle according to claim 1, wherein the mainframe is a pair of right and left frames having an oblong cylindrical shape in section, and the center frame is a pair of right and left frames connected to each of the right and left frames of the mainframe, respectively, said right and left frames of the center frame being broad in a direction towards a front and a rear of the vehicle.

6. The vehicle according to claim 1, further comprising seat rails and back stays, said air cleaner further comprising fitting brackets protruding upwardly therefrom, said fitting brackets being provided on right and left sides of a rear end rim of said front wall and on right and left sides of a rear end rim of said bottom wall, said fitting brackets being fastened to said seat rails and said back stays to mount said air cleaner thereto.

7. The vehicle according to claim 6, wherein said front wall is slightly inclined forward and said bottom wall extends along said stay, an upper part of said cylindrical case being covered with a seat of the vehicle and sides thereof being covered with a rear cover.

8. The air cleaner fitting structure for a vehicle according to claim 1, said air cleaner further comprising fitting brackets protruding upwardly therefrom, said fitting brackets being provided on right and left sides of a rear end rim of said front wall and on right and left sides of a rear end rim of said bottom wall, said fitting brackets being fastened to seat rails and back stays of said vehicle to mount said air cleaner thereto.

9. The air cleaner fitting structure for a vehicle according to claim 8, wherein said front wall is slightly inclined forward and said bottom wall extends along the stay of the vehicle, an upper part of said cylindrical case being covered with a seat of the vehicle and sides thereof being covered with a rear cover.

10. A vehicle, comprising:
- a vehicle frame having a pair of right and left center frames extending downward and connected to a mainframe extending rearwards from a head pipe,
- an internal combustion engine arranged in front of said center frame below said main frame;
- an air cleaner arranged rearward of said center frame, said air cleaner including:
  - a front wall and a bottom wall forming an acute angle therebetween, said front wall having an opening therein lined with a mesh material;
  - right and left sides enclosed by triangular side walls; and
  - a cylindrical case fitted inside said opening of said front wall, said cylindrical case for receiving a cleaner element on a bottom wall thereof;
- a fuel supply system arranged forward of said center frame;
- a connecting tube for connecting said air cleaner to a fuel supply system, said connecting tube being divided into a front half and rear half; and
- a division line between said front half and said rear half of said connecting tube is located at a position rearward from said center frame.

11. The vehicle according to claim 10, wherein said front half of said connecting tube is constructed of a flexible member, and said rear half of said connecting tube is constructed of a member having higher rigidity than said front half.

12. The vehicle according to claim 11, wherein said front half of said connecting tube is made of rubber, and said rear half of said connecting tube is made of resin.

13. The vehicle according to claim 10, further comprising a rear cushion oriented substantially in a vertical direction, between said air cleaner and said fuel supply system, and said connecting tube is arranged in a prescribed location, avoiding said rear cushion.

14. The vehicle according to claim 10, wherein said mainframe is a pair of right and left frames having an oblong cylindrical shape in section, and said center frame is a pair of right and left frames connected to each of said right and left frames of said mainframe, respectively, said right and left frames of said center frame being broad in a direction towards a front and a rear of said vehicle.

15. An air cleaner fitting structure for a vehicle, the vehicle including a vehicle frame having a pair of right and left center frames extending downward and connected to a mainframe extending rearwards from a head pipe, and including an internal combustion engine arranged in front of the center frame below the main frame; said air cleaner fitting structure comprising:
- an air cleaner, said air cleaner being mountable rearward of the center frame of the vehicle frame and including:
  - a front wall and a bottom wall forming an acute angle therebetween, said front wall having an opening therein lined with a mesh material;
  - right and left sides enclosed by triangular side walls; and
  - a cylindrical case fitted inside said opening of said front wall, said cylindrical case for receiving a cleaner element on a bottom wall thereof;
- a connecting tube for connecting said air to a fuel supply system mountable forward of the center frame, said connecting tube being divided into a front half and a rear half; and
- a division line between said front half and said rear of said connecting tube is locatable at a position rearward from the center frame of the vehicle.

16. The air cleaner fitting structure for a vehicle according to claim 15, wherein said front half of said connecting tube is constructed of a flexible member, and said rear half of said connecting tube is constructed of a member having higher rigidity than said front half.

17. The air cleaner fitting structure for a vehicle according to claim 16, wherein said front half of said connecting tube is made of rubber, and said rear half of said connecting tube is made of resin.

18. The air cleaner fitting structure for a vehicle according to claim 15, wherein a rear cushion of the vehicle is oriented substantially in a vertical direction, between the air cleaner and the fuel supply system, and said connecting tube is arranged in a prescribed location, avoiding the rear cushion.

19. The air cleaner fitting structure for a vehicle according to claim 15, wherein the mainframe is a pair of right and left frames having an oblong cylindrical shape in section, and the center frame is a pair of right and left frames connected to each of the right and left frames of the mainframe, respectively, said right and left frames of the center frame being broad in a direction towards a front and a rear of the vehicle.

20. The air cleaner fitting structure for a vehicle according to claim 15, said air cleaner further comprising fitting brackets protruding upwardly therefrom, said fitting brackets being provided on right and left sides of a rear end rim of said front wall and on right and left sides of a rear end rim of said bottom wall, said fitting brackets being fastened to seat rails and back stays of said vehicle to mount said air cleaner thereto.

21. The air cleaner fitting structure for a vehicle according to claim 20, wherein said front wall is slightly inclined forward and said bottom wall extends along the stay of the vehicle, an upper part of said cylindrical case being covered with a seat of the vehicle and sides thereof being covered with a rear cover.

* * * * *